United States Patent
Kumar et al.

(10) Patent No.: US 11,928,762 B2
(45) Date of Patent: Mar. 12, 2024

(54) ASYNCHRONOUS MULTI-USER REAL-TIME STREAMING OF WEB-BASED IMAGE EDITS USING GENERATIVE ADVERSARIAL NETWORK(S)

(71) Applicant: ADOBE INC., San Jose, CA (US)

(72) Inventors: Akhilesh Kumar, San Jose, CA (US);
Ratheesh Kalarot, San Jose, CA (US);
Baldo Faieta, San Francisco, CA (US);
Shabnam Ghadar, Menlo park, CA (US)

(73) Assignee: Adobe Inc., San Jose, CA (US)

(*) Notice: Subject to any disclaimer, the term of this patent is extended or adjusted under 35 U.S.C. 154(b) by 21 days.

(21) Appl. No.: 17/466,699

(22) Filed: Sep. 3, 2021

(65) Prior Publication Data
US 2023/0076196 A1   Mar. 9, 2023

(51) Int. Cl.
G06T 11/60 (2006.01)
G06N 3/045 (2023.01)
H04L 65/401 (2022.01)

(52) U.S. Cl.
CPC .............. *G06T 11/60* (2013.01); *G06N 3/045* (2023.01); *G06T 3/4046* (2013.01); *H04L 65/4015* (2013.01)

(58) Field of Classification Search
None
See application file for complete search history.

(56) References Cited

U.S. PATENT DOCUMENTS

| | | | |
|---|---|---|---|
| 2017/0337682 A1* | 11/2017 | Liao | A61B 5/7267 |
| 2018/0357552 A1* | 12/2018 | Campos | G06F 16/901 |
| 2020/0327440 A1* | 10/2020 | Cao | G06N 20/00 |
| 2020/0372308 A1* | 11/2020 | Anirudh | G06N 3/0454 |
| 2021/0056025 A1* | 2/2021 | Ramesh | G06F 12/0897 |
| 2021/0064923 A1* | 3/2021 | Lee | G06V 10/82 |
| 2021/0264235 A1* | 8/2021 | Zhang | G06F 17/18 |
| 2022/0004436 A1* | 1/2022 | Di Febbo | G06F 12/023 |

FOREIGN PATENT DOCUMENTS

CN    113762503 A   * 12/2021

OTHER PUBLICATIONS

Co-Pending U.S. Appl. No. 17/384,273, filed Jul. 23, 2021.
Co-pending U.S. Appl. No. 63/092,980, filed Oct. 16, 2020.
Zhu, J. Y., Krähenbühl, P., Shechtman, E., & Efros, A. A. (Oct. 2016). Generative visual manipulation on the natural image manifold. In European conference on computer vision (pp. 597-613). Springer, Cham.
Co-pending U.S. Appl. No. 17/182,492, filed Feb. 23, 2021.

* cited by examiner

*Primary Examiner* — Aaron M Richer
(74) *Attorney, Agent, or Firm* — Shook, Hardy & Bacon L.L.P.

(57) ABSTRACT

Embodiments of the present invention provide systems, methods, and computer storage media for editing images using a web-based intermediary between a user interface on a client device and an image editing neural network(s) (e.g., a generative adversarial network) on a server(s). The present image editing system supports multiple users in the same software container, advanced concurrency of projection and transformation of the same image, clubbing transformation requests from several users hosted in the same software container, and smooth display updates during a progressive projection.

20 Claims, 8 Drawing Sheets

ASYNCHRONOUS MULTI-USER REAL-TIME STREAMING OF WEB-BASED IMAGE EDITS USING GENERATIVE ADVERSARIAL NETWORK(S)

BACKGROUND

In recent years, computer engineers have developed software and hardware platforms for modifying digital images using various models, such as neural networks, including generative adversarial networks ("GANs"). Based on such developments, some conventional image editing systems can modify digital images by extracting features from digital images and combining the extracted features with those from other digital images. Other conventional systems can modify digital images by performing generative operations to adjust features that correspond to specific visual attributes (e.g., age, anger, surprise, or happiness). However, many conventional image editing systems require substantial computing resources to modify images using GANs. Consequently, conventional systems often cannot modify or edit images in real-time using a GAN and frequently limit image editing operations to devices with powerful processors.

SUMMARY

Embodiments of the present invention are directed to an improved image editing system for editing images using a web-based intermediary between a user interface on a client device and an image editing neural network(s) (e.g., a generative adversarial network) on a server(s). In some embodiments, the improved image editing system supports multiple users in the same software container by running a multi-process container that supports multiple workers, where each worker supports multiple independent image editing sessions for multiple users. In some embodiments, an encoder network is repetitively invoked to progressively project an image into a latent space to extract and optimize a latent vector for the image, while a generator network concurrently generates a transformed image from an interim (non-optimized) latent vector generated during progressive projection. In some embodiments, transformation requests from several users hosted by the same container are clubbed into one request prior to invoking a generator network. Furthermore, some embodiments display smooth updates during a progressive projection using an arithmetically incrementing step size between iterations that trigger successive display updates. As such, using implementations described herein, multiple users can use the same container to perform various web-based image editing operations asynchronously in the same container, and the results are streamed back to multiple users in real-time.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Conventional image editing systems that use machine learning models such as neural networks (e.g., GANs) often inefficiently consume computing resources when extracting features from (or generating) images. In particular, conventional systems can consume significant processing time, processing power, and memory when modifying images using a GAN or other neural network. Furthermore, some conventional image editing systems can only modify digital images at slow speeds when using a particular processor to execute a neural network, and conventional systems that use local GANs to modify images on a particular computing device (e.g., mobile or simple laptop devices) are often too slow for real-time application. Unless the conventional system is running on a computer with a powerful graphical processing unit ("GPU"), modifying a digital image using a GAN takes a significant amount of time that forecloses the possibility of performing such modifications as part of interactive, on-the-fly image editing. Due at least in part to their computationally intensive nature and their speed constraints, many conventional image editing systems limit image editing operations to particularly powerful computing devices because of the computational requirements of GAN operations and other neural network operations. As a result, conventional systems often cannot perform real-time editing with a neural network on many client devices, and the computational expense of these edits also frequently prevents their application on less powerful devices (e.g., mobile devices).

One prior technique described in U.S. application Ser. No. 17/182,492 involves the use of a stream renderer acting as a web-based intermediary between a user interface on a client device and an image editing neural network(s) (e.g., a GAN) on a server to facilitate image editing. At a high level, the user interface and the stream renderer open up a digital stream between them (e.g., a webRTC stream carrying a video feed), so requested edits from the user interface get sent through the digital stream to the stream renderer, which interfaces with the image editing neural network(s) to generate edited images, and updates the digital stream so the client device can render the edited images. For example, a GAN typically includes an encoder network and a generator network. When the stream renderer receives an image to be edited, it interfaces with the encoder network to project the image into a latent space to extract a latent vector that represents the image. Edits made in the user interface are sent to the stream renderer, which modifies the latent vector accordingly to generate a target latent vector, and sends the target latent vector to the generator network to generate a transformed image corresponding to the edits. When the stream renderer receives the transformed image from the neural network, it updates the digital stream (e.g., by sending to the client device an image delta that indicates a difference between the original and transformed image), which allows the user interface on the client device to render the transformed digital image.

However, this prior technique has some limitations. For example, hosting a stream renderer for each of multiple users in its own container can result in inefficient utilization of resources, both on a server that runs a stream renderer and a server that runs an image editing neural network. Furthermore, progressively projecting an uploaded image to extract a latent vector can take 100 iterations of encoding and tuning, which can take 10-12 seconds. During that time, progress updates displayed to the user can appear choppy and uneven. Moreover, any delay between initiating a progressive projection and when the user is able to edit is undesirable. As such, there is room for improvement in processing speed, concurrency of supporting operations, and overall system responsiveness.

Accordingly, embodiments of the present invention are directed to an improved image editing system for editing images using a web-based intermediary between a user interface on a client device and an image editing neural network(s) (e.g., a GAN) on a server(s). In some embodiments, the improved image editing system supports multiple users in the same software container, advanced concurrency of projection and transformation of the same image, clubbing transformation requests from several users, and/or smooth display updates during a progressive projection.

With respect to supporting multiple users in the same software container, in some embodiments, a particular server supports multiple software containers (e.g., DOCKER® containers), each container supports multiple workers, and each worker supports multiple users. Generally, a worker can be thought of as a process running in a container. When a new user connects to the server, instead of spinning up a dedicated container for that user, the server creates a session for the user on a particular worker in a multi-process container. Each session is provisioned with its own resources, so the user can use that session to support his or her edits independently of other sessions for other users on the same worker, the same container, and the same machine. Thus, embodiments of the present technique disentangle the worker from the user, which enables supporting larger numbers of users than simply the number of supported workers.

With respect to advanced concurrency, in some embodiments, an encoder network is repetitively invoked to progressively project an image into a latent space to extract and optimize a latent vector for the image, while a generator network concurrently generates a transformed image from an interim (non-optimized) latent vector generated during progressive projection. To accomplish this, some embodiments use dual layered memory, including a persistent layer used for projection and a non-persistent layer used for transformation. More specifically, the persistent layer periodically stores the latest version of the latent vector generated during progressive projection (e.g., an interim version, an optimized version). Changes made to the persistent layer are copied to the non-persistent layer. This way if a requested edit is received before the latent vector has been optimized, an interim latent vector can be modified and used to generate a transformed image corresponding to the requested edit. Since the two layers can be modified independently of one other, projection and transformation can be executed simultaneously on the same image.

With respect to clubbing transformation requests, in some embodiments, transformation requests from several users hosted by the same container are clubbed into one request prior to invoking a generator network. In an example embodiment, each container has its own database (e.g., a REDIS™ database) and a client that interfaces with the generator network. Rather than invoking the generator network for each transformation request, each worker running in the container writes transformation requests (e.g., target latent vectors) generated by any session on that worker (e.g., any user using that worker) to the database. The transformation requests are aggregated into a batch until the batch is full (e.g., 32 requests), a threshold time limit elapse (e.g., 100 milliseconds), or otherwise. Then, the aggregated requests get picked up, packaged (e.g., into an array of target latent vectors), and sent to the generator network (e.g., through a transformation API, a client such as TCP or GRCP, etc.) to trigger the generator network to generate transformed images for each constituent request (target latent vector) in the batch. The transformed images are sent back, written to the database, and picked back up by the worker that generated the corresponding request. This technique improves utilization of the processor (e.g., GPU) running the generator network by reducing down time when processing transformation requests from multiple users being hosted in the same container.

With respect to smooth display updates during a progressive projection, and by way of background, progressive progression is a repetitive optimization process in which an image is encoded into a latent vector by an encoding network, the latent vector is transformed back into an image by a generator network, and the generated image is compared to the original image and used to tune the latent vector. The process is repeated over multiple iterations until the latent vector is optimized. However, during the optimization process, the changes between images generated during successive iterations are not uniform throughout the duration process. More specifically, there are usually larger changes over the first few iterations followed by small changes over the last few iterations. Rather than simply displaying each generated image as an indication of the progress of the optimization, some embodiments display a generated image after the conclusion of certain iterations, with the step size between display updates increasing over time. In an example using an arithmetically incrementing step size, a generated image is displayed after a step size that increases (e.g., by 1) after each display update. In this example, generated images are displayed after iterations 1, then 1+2=3, then 3+3=6, then 6+4=10, then 10+5=15, then 15+6=21, etc. Using an arithmetic increment between successive display updates creates a smoothly updating image.

As such, using implementations described herein, multiple users can use the same container to perform various web-based image editing operations asynchronously in the same container, and the results are streamed back to multiple users in real-time. In various embodiments, the image editing system described herein leverages dual layered memory to support asynchronously executing projection and transformation operations on the same image, clubs transformation requests from several users hosted in the same container to improve processor utilization, and/or uses an arithmetic increment to increase the step size between successive display updates to present smooth updates during a progressive projection. As a result, the present techniques represent a significant improvement over prior techniques terms of computational cost, speed, concurrency, responsiveness, and user experience.

Example Image Editing Environment

Figure 1:
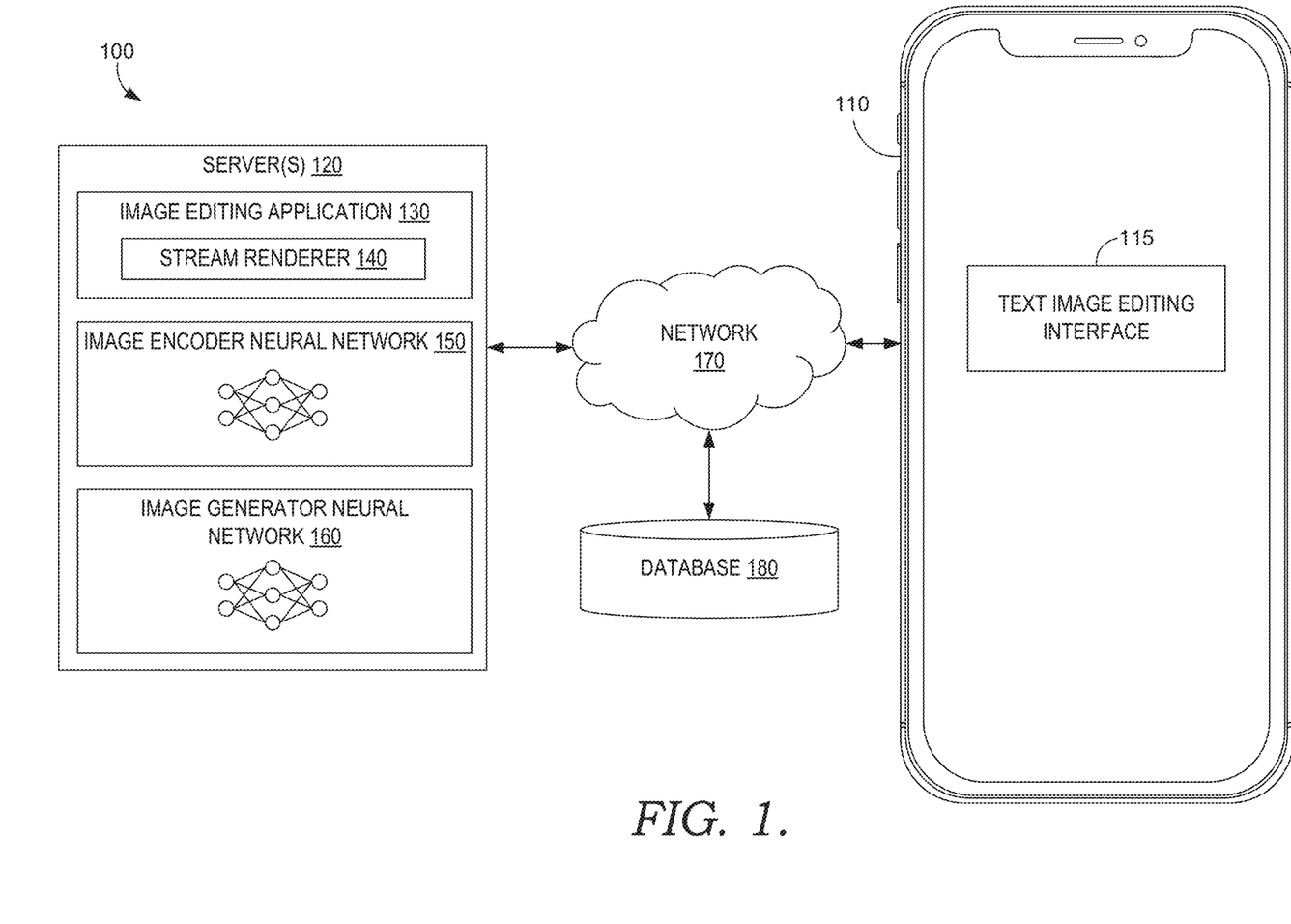
FIG. 1 is a block diagram of an example computing system suitable for image editing, in accordance with embodiments of the present invention.

Referring now to FIG. 1, a block diagram of example environment 100 suitable for use in implementing embodiments of the invention is shown. Generally, environment 100 is suitable for image editing. At a high level, environment 100 includes client device 110, server(s) 120, and database 180.

Depending on the implementation, client device 110 and/or server(s) 120 are any kind of computing device capable of facilitating image editing. For example, in an embodiment, client device 110 and/or server(s) 120 are each a computing device such as computing device of FIG. 8. In some embodiments, client device 110 and/or server(s) 120 are a personal computer (PC), a laptop computer, a mobile or mobile device, a smartphone, a tablet computer, a smart watch, a wearable computer, a personal digital assistant (PDA), a music player or an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, any combination of these delineated devices, or any other suitable computer device.

In various implementations, the components of environment 100 include computer storage media that stores information including data, data structures, computer instructions (e.g., software program instructions, routines, or services), and/or models (e.g., 3D models, machine learning models) used in some embodiments of the technologies described herein. For example, in some implementations, database 180 comprises a data store (or computer data memory). Further, although depicted as a single data store component, in some embodiments, database 180 is embodied as one or more data stores (e.g., a distributed storage network), is implemented in the cloud, and/or is implemented in server(s) 120 and/or client device 110. In some embodiments, client device 110 and/or server(s) 120 comprise one or more corresponding data stores, and/or are implemented using cloud storage.

In the example illustrated in FIG. 1, the components of environment 100 communicate with each other via a network 170. In some non-limiting example implementations, network 170 includes one or more local area networks (LANs) and/or wide area networks (WANs). Such networking environments are commonplace in offices, enterprise-wide computer networks, intranets, and the Internet.

In the example illustrated in FIG. 1, client device 110 includes image editing interface 115 and server(s) 120 include image editing application 130. In some embodiments, image editing interface 115, image editing application 130, and/or any of the elements illustrated in FIG. 1 are incorporated, or integrated, into an application(s), or an add-on(s) or plug-in(s) to an application(s). In some embodiments, the application(s) is a stand-alone application, a mobile application, a web application, or the like. For example, in some implementations, the application(s) comprises a web application that runs in a web browser (e.g., on client device 110) and/or is hosted at least partially server-side. In some cases, the application is integrated into an operating system (e.g., as a service). Although some embodiments are described with respect to an application(s), some implementations additionally or alternatively integrate any of the functionality described herein into an operating system (e.g., as a service), a server (e.g., a remote server), a distributed computing environment (e.g., as a cloud service), and/or otherwise.

Depending on the embodiment, various allocations of functionality are implemented across any number and/or type(s) of devices. In the example illustrated in FIG. 1, image editing interface 115 and image editing application 130 coordinate via network 170 to execute the functionality described herein. In another example, image editing interface 115 and image editing application 130 (or some portion thereof) are integrated into a common application executable on a single device. In yet another example, image editing interface 115 and image editing application 130 (or some portion thereof) are distributed across some other number and/or type(s) of devices. These are just examples, and any suitable allocation of functionality among these or other devices is possible within the scope of the present disclosure.

To begin with a high-level overview of an example workflow through the configuration illustrated in FIG. 1, a user operating client device 110 uses image editing interface 115 to upload an image to image editing application 130 (e.g., stream renderer 140 of image editing application 130) on server(s) 120 via network 170 and to perform edits on the image. Generally, stream renderer 140 and image editing interface 115 open up a digital stream (e.g., a video feed) through which image editing interface 115 transmits an image to be edited and/or a representation of desired edits to stream renderer 140, and through which stream renderer 140 transmits a representation of edited images (e.g., an image-differential metric that indicates changes to a digital image or a digital video feed) to image editing interface 115. When a user uploads an image to stream renderer 140, stream renderer 140 triggers a projection of the image into a latent space using image encoder neural network 150 to extract and optimize a latent vector that represents the image.

During the projection process, stream renderer 140 receives interim (e.g., non-optimized) latent vectors, which are used in some embodiments as an approximation to accelerate edits. For example, when a user uses image editing interface 115 to indicate a desired edit, image editing interface 115 transmits a representation of the desired edit to stream renderer 140, and stream renderer 140 reads the most recent version of the latent vector available (e.g., an interim or optimized latent vector), modifies it based on the desired edit, and triggers image generator neural network 160 to generate a transformed image from the target latent vector, thereby transforming the original image into a transformed image. The transformed image is passed to stream renderer 140, which transmits it (or determines and transmits a reduced representation thereof) via the digital stream (e.g., in a frame of a video feed) to image editing interface 115 for rendering on client device 110.

Looking more specifically at the components of FIG. 1, in some embodiments, image editing interface 115 is part of an application such a web application, a native application installed on client device 110 (e.g., a mobile application, a desktop application, etc.), or a cloud-based application where all or part of the functionality is performed by server(s) 120. Generally, image editing interface 115 presents or displays information to a user and accepts various inputs selecting and/or modifying one or more aspects of an image. Various embodiments implement any suitable user interface functionality, such as that described in U.S. application Ser. No. 17/182,492, filed on Feb. 23, 2021, the contents of which are herein incorporated by reference in their entirety. Unlike many conventional systems, the components of environment 100 enable real-time, interactive, generative (e.g., via a GAN) image editing via image editing interface 115 on a mobile device. Although FIG. 1 illustrates a single instance of client device 110, in some embodiments, environment 100 includes multiple different client devices, each associated with a different user (e.g., a digital image editor).

Server(s) 120 generate, track, store, process, receive, and transmit electronic data, such as representations of desired edits and corresponding transformed images. In some embodiments, server(s) 120 comprise a distributed server including a number of server devices distributed across network 170 and located in different physical locations. In various implementations, server(s) 120 comprise a content server, an application server, a communication server, a web-hosting server, a multidimensional server, a machine learning server, and/or other server devices. In some embodiments, server(s) 120 communicate with client device 110 to perform various functions associated with image editing application 130 and/or image editing interface 115, such as storing and managing a repository of images, modifying images, and providing modified digital images for display. For example, image editing application 130 of server(s) 120 communicates with database 180 to access, store, and/or manage a repository of digital images, latent vectors representing digital images, data associated with a particular user, account, or session, and/or other data associated with image editing application 130 or image editing interface 115.

At a high level, server(s) 120 includes image editing application 130, which itself includes stream renderer 140. In simple example involving a single user on a single client device (e.g., client device 110), stream renderer 140 performs various functions such as coordinating with image editing interface 115 to open a digital stream and serving as a web intermediary between image editing interface 115 on the one hand and image encoder neural network 150 and image generator neural network 160 on the other. Example streaming and intermediary functions of stream renderer 140 are described in more detail in U.S. application Ser. No. 17/182,492.

In a more detailed example involving multiple users on multiple client devices (e.g., client device 110), server(s) 120 include multiple software containers (e.g., Docker containers), which run multiple stream renderers (e.g., stream renderer 140). In some embodiments, one or more of the containers are a multi-process container that supports multiple workers (processes), and in some embodiments each worker supports multiple sessions (users). When a new user connects to one of server(s) 120, the server creates a session for the user on a particular worker in a multi-process container, and each session includes its own stream renderer 140 (or some portion thereof). Thus, depending on the embodiment and/or scenario, each container and/or each worker runs multiple instances of stream renderer 140 (or some portion thereof), which enables server(s) 120 to support multiple users on the same worker, in the same container, and/or on the same server device using server(s) 120 to interface with, and trigger, image encoder neural network 150 and/or image generator neural network 160. In some embodiments, dual layered memory in database 180 enables concurrently running image encoder neural network 150 and image generator neural network 160 to perform corresponding operations on the same image. In some embodiments, during a progressive projection of an image using image encoder neural network 150, stream renderer 140 increments the step size between successive display updates to present smooth updates to image editing interface 115 during the progressive projection. Additionally or alternatively, a particular container is provisioned with logic that clubs transformation requests for image generator neural network 160 from multiple users using the same container.

In some embodiments, image encoder neural network 150 and image generator neural network 160 are part of a GAN. Generally, a GAN is a neural network that typically includes an encoder neural network (e.g., image encoder neural network 150) that extracts a latent code (or latent vector) from an image and a generator neural network (e.g., image generator neural network 160) that synthesizes a digital image from a latent code (or latent vector). GANs are typically tuned or trained via an adversarial process with a discriminator network that tries to detect fake (synthetized) images from real ones. Through the adversarial training process, the generator neural network learns to generate high quality images that fool the discriminator neural network. An example GAN used by some embodiments is the iGAN described by Jun-Yan Zhu, Philipp Krähenbühl, Eli Shechtman, and Alexei A. Efros in *Generative Visual Manipulation on the Natural Image Manifold*, European Conference on Computer Vision 597-613 (2016), the contents of which are herein incorporated by reference in their entirety. Other example GANs used by some embodiments include StyleGAN, StyleGAN2, RealnessGAN, ProGAN, or any other suitable generative neural network. In some embodiments, instead of or in addition to image encoder neural network 150 and/or image generator neural network 160, some other neural network than a generative neural network is used, such as a PixelRNN or a PixelCNN.

In an example implementation, image encoder neural network 150 and image generator neural network 160 are part of a GAN trained for face editing, and image editing interface 115 provides one or more controls that allow a user to indicate desired changes to a face in an image (e.g., an uploaded image). In some embodiments, image editing interface 115 presents the image (e.g., as part of a digital video feed) along with one or more selectable interface elements that trigger various generative and supporting operations (e.g., operation of stream renderer 140, image encoder neural network 150, image generator neural network 160). In some cases, image editing interface 115 presents a grid of alternative images selectable to modify the original image by blending or mixing features from a selected image with those of the original digital image. In some cases, image editing interface 115 includes slider or other elements that control adjustments to corresponding image features. In an example face editing implementation, one or more control elements (e.g., corresponding sliders) or other interface features determine values of adjustable image features, such as happiness, surprise, age, anger, baldness, etc. Upon receiving some indication of a desired edit to an image, image editing interface 115 provides a representation of the desired edit (e.g., values that represent the adjustable image features) to stream renderer 140, which generates a target latent vector corresponding to the desired edit, and interfaces with image generator neural network 160 to generate an image from the target latent vector. Stream renderer 140 accesses the generated image, and transmits a representation of the generated image (e.g., the generated image itself, a reduced representation such as image differential metric) back to image editing interface 115 for rendering. More details of these and other image editing implementations are described in more detail in U.S. application Ser. No. 17/182,492. Although some embodiments are described with respect to generating and modifying images in a particular domain (e.g., faces), this is meant simply as an example, as other implementations are possible in other domains, such as cars, buildings, people, landscapes, animals, furniture, food, etc.

Figure 2:
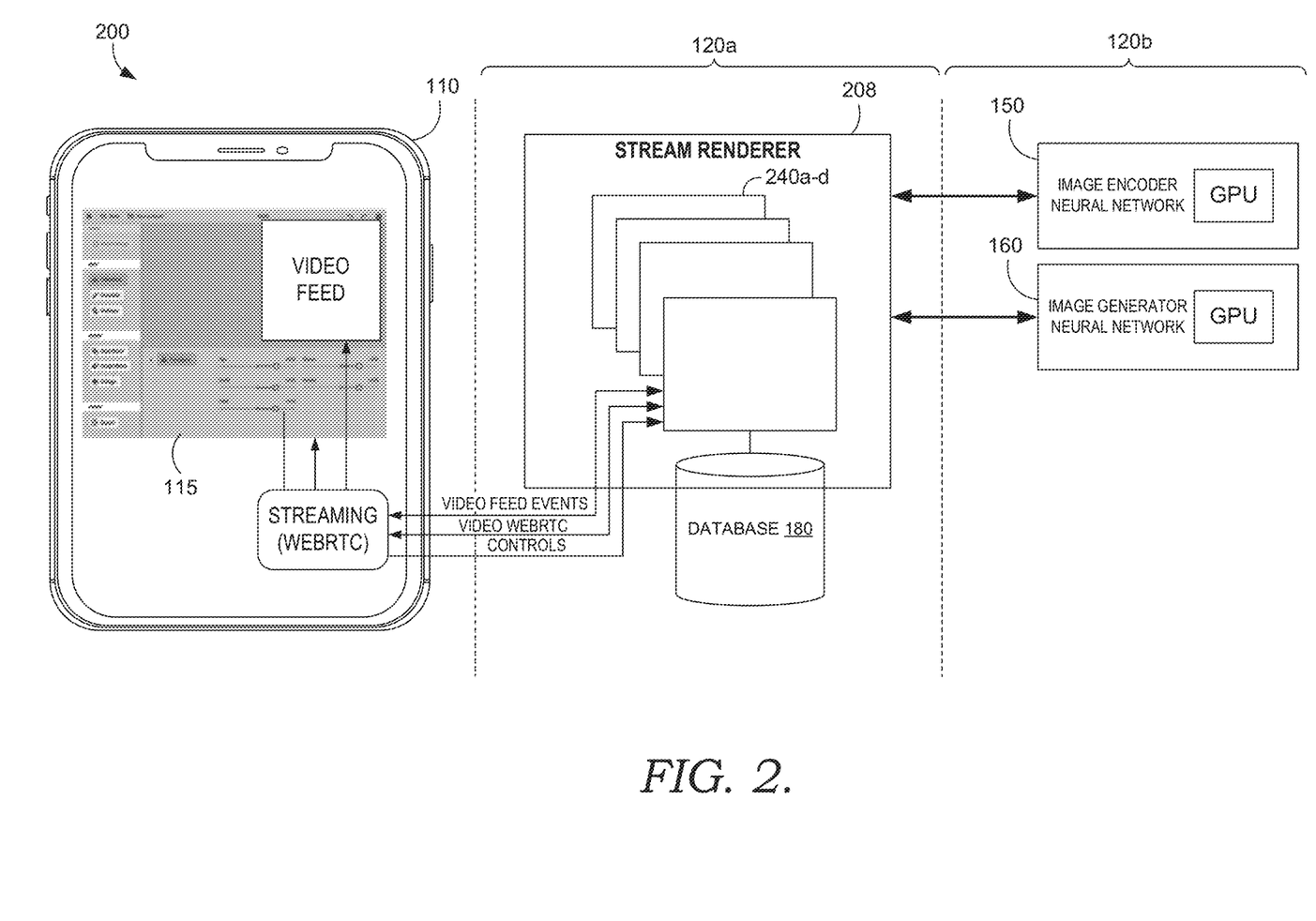
FIG. 2 is a data flow diagram illustrating an example distributed image editing system, in accordance with embodiments of the present invention.

In one or more embodiments, environment 100 utilizes a multi-faceted architecture of computing devices at different network locations (and/or different physical/geographical locations) working together to generate and provide real-time image edits to client device 110. In some cases, stream renderer 140, encoder neural network 150, and/or image generator neural network 160 are located at the same server or at different servers across a network, each performing different operations. FIG. 2 is a data flow diagram illustrating an example distributed image editing system 200, in accordance with embodiments of the present invention.

In FIG. 2, distributed image editing system 200 includes client device 110 at a first network location, container 208 at a second network location (server 120a), and one or more neural networks (e.g., image encoder neural network 150 and image generator neural network 160) at one or more other network locations (servers 120b). In some embodiments, client device 110 of FIG. 2 corresponds to client device 110 of FIG. 1, server 120a and servers 120b of FIG. 2 correspond to server(s) 120 of FIG. 1, and/or image encoder and image generator neural networks 150 and 160 of FIG. 2 correspond to image encoder and image generator neural networks 150 and 160 of FIG. 1.

In some embodiments, server 120a supports and/or runs multiple software containers (e.g., Docker containers), such as container 208. In some embodiments, container 208 is a multi-process container that runs multiple workers. When container 208 is created, it is provisioned with resources (e.g., 16 vCPUs, 32 GB of RAM of database 180, 5 workers, etc.). In some embodiments, one or more workers in the container support multiple users, with the number of supported users per worker depending on how resource intensive the application(s) and/or processes being run in container 208 are. In FIG. 2, container 208 is illustrated running multiple stream renderers 240a-d (e.g., multiple instances of stream render 140 of FIG. 1). In an example embodiment, each worker in container 208 runs and/or has access to one or more instances of a stream render (e.g., one per session).

When a new user using client device 110 connects to server 120a (e.g., server code running in container 208, one of its workers, and/or one of stream renderers 240a), server 120a creates a session for the user (e.g., on a particular worker in container 108). Each session is provisioned with its own resources (e.g., an instance of a stream renderer, or some portion thereof), so the user can use that session to support his or her edits independently of other sessions for other users on the same worker. Thus, each stream renderer 240a-d (or some portion thereof) supports a different user and a corresponding session for that user. In some embodiments, session data (e.g., uploaded and/or generated images) is stored in and/or copied to a portion of database 180 (e.g., external to the portion provisioned to container 208) so a particular user can log in and access his or her session data at some later time.

Taking stream renderer 240a as an example, stream renderer 240a includes logic for various functions, such as setting up and managing a digital stream such as a video feed (e.g., via Web Real-time Communication or WebRTC), state management of a connection with client device 110, session management, receiving a representation of control inputs into image editing interface 115 transmitted via a channel associated with the digital stream, storing latent vectors (e.g., within the database 180), generating target latent vectors corresponding to requested edits, triggering neural network operations (e.g., via one or more APIs), encoding frames or some other representation of generated images into the digital stream (e.g., a video feed) or corresponding digital stream events (e.g., video feed events), and/or other functions.

In some embodiments, stream renderer 240a uses image encoding neural network 150 for projections and uses image generator neural network 160 for generating modified images from target latent vectors (sometimes referred to as transformations). More specifically, image encoding neural network 150 (e.g., which in some embodiments executes on a GPU) extracts a latent vector from an image. In some embodiments, image encoding neural network 150 is repetitively invoked to progressively project an image into a latent space to extract and optimize the latent vector for the image. In some embodiments, successive versions of the latent vector are sent to or otherwise accessed by stream renderer 240a during and as a result of optimization, including interim versions prior to optimization and the final optimized version. In some cases, extracting a latent vector can take around 10-12 seconds for 100 iterations. Rather than requiring the optimization process to complete before initiating editing operations, stream renderer 240a makes a current or more recently available (e.g., interim or optimized) version of the latent vector available for editing (transformation) operations. Thus, when stream renderer 240a receives an indication of a desired edit, it accesses the available version of the latent vector, modifies it to generate a target latent vector, and invokes image generator neural network 160 (e.g., which in some embodiments executes on a GPU) to generate a corresponding image. Example latent vectors and latent vector modification techniques are described in U.S. application Ser. No. 17/182,492. As such, it is possible for stream renderer 240a to invoke image encoding neural network 150 and image generator neural network 160 to simultaneously perform operations associated with the same image, such that image encoding neural network 150 and image generator neural network 160 are executing the operations concurrently.

Figure 3:
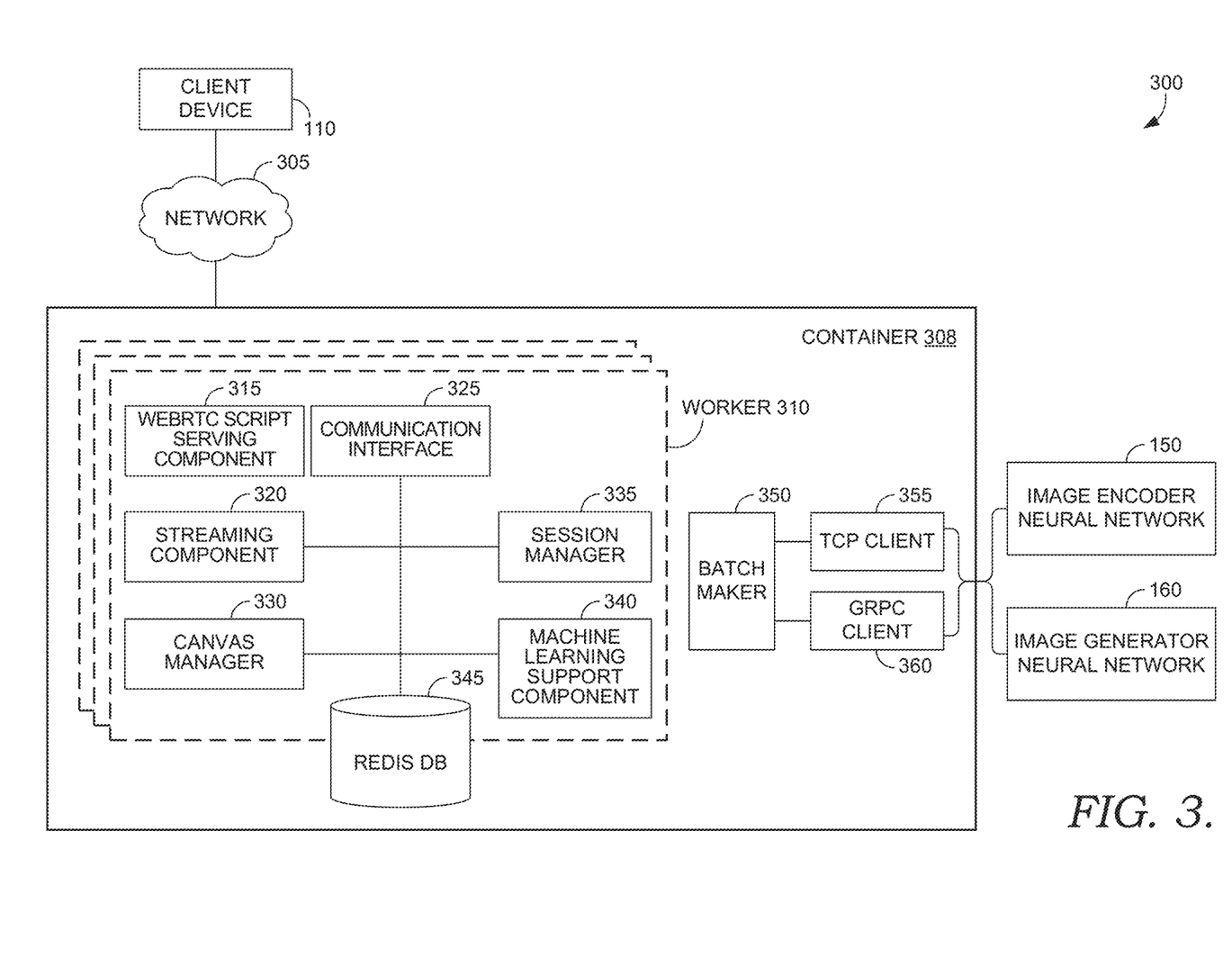
FIG. 3 is a block diagram of an example environment with a container executing multiple stream renderers, in accordance with embodiments of the present invention.

FIG. 3 is a block diagram of an example environment 300 with a container 308 executing multiple stream renderers, in accordance with embodiments of the present invention. At a high level, environment 300 includes client device 110 at a first network location, container 308 at a second network location, and one or more neural networks (e.g., image encoder neural network 150 and image generator neural network 160) at one or more other network locations. In some embodiments, client device 110 of FIG. 3 corresponds to client device 110 of FIG. 1 or 2, container 308 of FIG. 3 correspond to container 208 of FIG. 2, and/or image encoder and image generator neural networks 150 and 160 of FIG. 3 correspond to image encoder and image generator neural networks 150 and 160 of FIG. 1 or 2.

In FIG. 3, container 308 is illustrated running multiple workers, including worker 310. When container 308 is created, it is provisioned with resources (e.g., worker 310, a portion of a database such as Redis database 345, etc.). In FIG. 3, Redis database 345 is illustrated as partially inside worker 310 because a portion has been provisioned for use by worker 310. FIG. 3 illustrates an example implementation using Redis database 345, however, any suitable database is possible within the scope of the present disclosure. In some cases, some or all of the components illustrated inside worker 310 of FIG. 3 correspond to one of stream renderers 240a-d of FIG. 2. In some cases, a particular component running on worker 310 supports multiple users. In other cases, particular component running on worker 310 supports a single user, so multiple instances of the component are executed by worker 310 to support multiple users. This is just meant as an example, and any suitable implementation is possible within the scope of the present disclosure.

In FIG. 3, worker 310 includes WebRTC script serving component 315, streaming component 320, communication interface 325 (e.g., Async API Server), canvas manager 330, session manger 335, machine learning support component 340, and a portion of Redis database 345. At a high level, WebRTC script serving component 315 includes logic that serves scripts (e.g., for executing image editing interface 115 of FIG. 1 or 2) to client device 110. Streaming component 320 includes logic for setting up, handling, managing, and/or communicating through a WebRTC stream. Communication interface 325 includes logic that serves as a message broker among client device 110 and the components running on worker 310. In an example embodiment, communication interface 325 includes server code for an AsyncAPI server, such as a FastAPI server. Canvas manager 330 includes logic for outputting to and/or otherwise managing a canvas (e.g., image editing interface 115 of FIG. 1 or 2) being displayed on client device 110 (e.g., via streaming component 320). Session manger 335 includes logic for creating, assigning, and managing sessions for multiple users. Machine learning support component 340 provides supporting and intermediary operations for triggering image encoder and image generator neural networks 150 and 160 (e.g., managing interim and optimized latent vectors in non-persistent and persistent layers in Redis database 345, generating target latent vectors, outputting display updates to canvas during a progressive projection, etc.).

In an example process, when a new user uses a client application (e.g., a browser or mobile application) on client device 110 to request to connect to a website associated with an application hosted in container 308 on a server, the client application connects to (or is redirected to) communication interface 325 (e.g., AsyncAPI, FastAPI), which causes session manager 335 to create a session for the user (or look up and assign a previous and/or existing session) on a particular worker (e.g., worker 310). In creating a session for a new user, session manager 335 provides the client application with any required resources. In an example implementation, session manager 335 causes WebRTC script serving component 315 to send the client application front end scripts (e.g., Java, HTML, CSS, etc.) for executing an image editing interface (e.g., image editing interface 115 of FIG. 1 or 2) on client device 110. Then, client device 110 can execute those scripts to establish a webRTC connection with streaming component 320 via network 305 (e.g., which in some embodiments includes a Session Traversal Utilities for NAT (STUN) server and/or a Traversal Using Relay NAT (TURN) server). If, for example, there are five users all trying to access the application hosted in container 308 at the same time, session manager 335 creates five sessions on worker 310, and each session works independently of the others. This allows multiple users to share the same container, which improves utilization and reduces down time. In an example implementation with 16 vCPU per container, a number of workers given by 2*N+1 (where N is the number of cores in the container), and 3 users per worker, a single container can support 99 users.

In some embodiments, machine learning support component 340 performs various supporting and intermediary operations associated with triggering image encoder and image generator neural networks 150 and 160 on behalf of a user operating client device 110. For example, in some embodiments, machine learning support component 340 causes display updates to a canvas on client device 110 during a progressive projection to represent the progress of the projection. In some cases, a multi-step projection takes a perceivable amount of time to complete (e.g., 10 seconds). During that time, multi-step projection produces an interim latent vector and transforms the interim latent vector into an image that approximates the original image. Thus, after some or all the iterations (e.g., after each iteration, every N iterations such as 10 iterations, after a variable number of iterations that increases over time, for example, arithmetically etc.), a representation of the corresponding approximated image is output to canvas.

In some embodiments, changes to the approximated image throughout the projection process are not uniform across the iterations of the projection process. In some cases, the changes can be represented by a log function, such that larger changes occur over the first few iterations followed by very small changes over the last few iterations. However, smooth display updates are possible, for example, by outputting the approximated image generated after a variable number of iterations that increases over time (e.g., arithmetically). That is, the step size between iterations after which the canvas is updated increases over time. In an example of an arithmetic increment of 1, approximated images are displayed after iterations 1, then 1+2=3, then 3+3=6, then 6+4=10, then 10+5=15, then 15+6=21, etc. Using an arithmetic increment between successive display updates creates a smoothly updating image.

Figure 4:
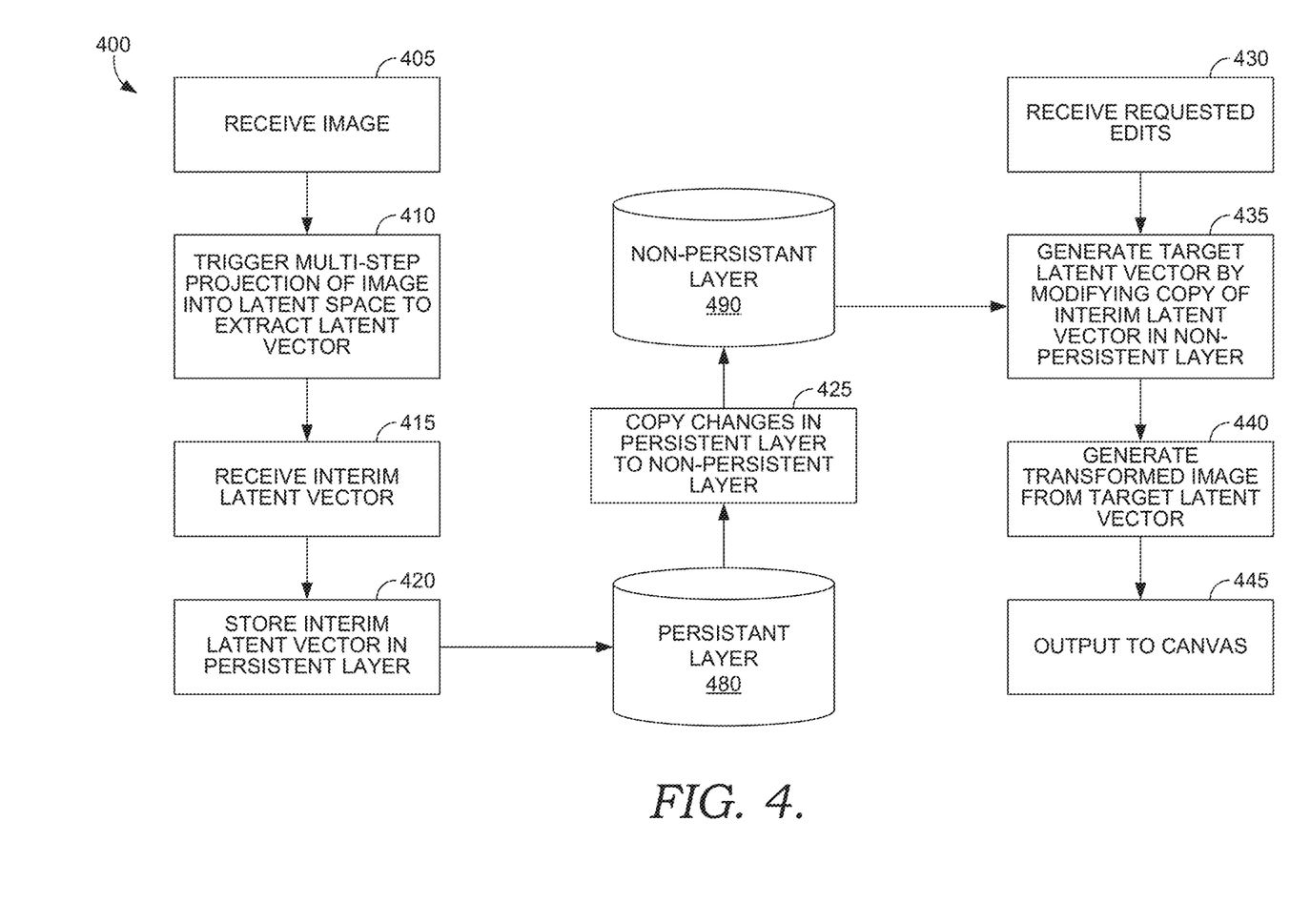
FIG. 4 is a flow diagram illustrating an example method for concurrently executing projection and transformation operations for the same image, in accordance with embodiments of the present invention.

Additionally or alternatively, in some embodiments, machine learning support component 340 coordinates concurrently executing projection and transformation operations for the same image, in part, by managing interim and optimized latent vectors in non-persistent and persistent layers in Redis database 345. FIG. 4 is a flow diagram illustrating an example method 400 for concurrently executing projection and transformation operations for the same image, in accordance with embodiments of the present invention.

FIG. 4 depicts two portions of memory, persistent layer 480 and non-persistent layer 490. In some embodiments, persistent layer 480 of FIG. 4 corresponds with a persistent layer in Redis database 345 of FIG. 3, and non-persistent layer 490 of FIG. 4 corresponds with a non-persistent layer in Redis database 345 of FIG. 3. In an example embodiment, persistent layer 480 is used for projection and non-persistent layer 490 is used for transformation. In some cases, projection is an optimization process that produces increasingly accurate versions of a latent vector until the latent vector is optimized. Rather than waiting until the optimization process is complete before allowing transformations to occur, in some embodiments, the interim latent vector is written to persistent layer 480, and copied to non-persistent layer 490, where it can be used for transformation operations.

Initially at block 405, an image is received. For example, a user may use image editing interface 115 of FIG. 1 or 2 to upload an image for editing to stream renderer 140 of FIG. 1, stream renderer 240a of FIG. 2, or machine learning support component 340 of FIG. 3 (e.g., via a digital stream and streaming component 320). At block 410, a multi-step projection of the image into a latent space is triggered to extract a latent vector from the image. For example, machine learning support component 340 of FIG. 3 invokes a projection API (which in some embodiments is part of communication interface 325), which sends the image to image encoding neural network 150 (e.g., via TCP client 355 or GRPC client 360). Whether the logic that invokes multiple feedforward passes of image encoding neural network 150 and subsequent tuning is associated with image encoding neural network 150, the projection API, machine learning support component 340, or elsewhere, at block 415, an interim (temporary or non-optimized) latent vector is received (e.g., by machine learning support component 340), and the interim latent vector is stored (e.g., by machine learning support component 340) in persistent layer 480. At block 425, changes to persistent layer 480 are copied to non-persistent layer 490.

In some cases, the multi-step projection takes a perceivable amount of time to complete (e.g., 10 seconds). During that time, multi-step projection produces an interim latent vector with each iteration. After some or all the iterations (e.g., after each iteration, every N iterations such as 10 iterations, etc.), the corresponding interim latent vector is stored in memory. Thus, blocks 415-425 occur repetitively throughout the multi-step projection (e.g., every N iterations) while the latent vector is being optimized. As such, non-persistent layer 490 stores an interim version of the latent vector, before the optimization process has been completed, and the interim version can be used for transformations.

More specifically, at block 430, a desired edit is received. For example, a user operating image editing interface 115 of FIG. 1 or 2 indicates a desired edit (e.g., using one or more control elements to indicate corresponding changes), and image editing interface 115 sends a representation of the desired edit to stream renderer 140 of FIG. 1, stream renderer 240a of FIG. 2, or machine learning support component 340 of FIG. 3 (e.g., via a digital stream and streaming component 320). In some embodiments, to improve transfer speed, the desired edit is sent through a user datagram protocol (UDP) channel. At block 435, a target latent vector is generated by modifying the copy of the interim latent vector stored in non-persistent layer 490. For example, machine learning support component 340 of FIG. 3 generates a target latent vector using any known technique, such as those described in U.S. application Ser. No. 17/182,492. At block 440, a transformed image is generated from the target latent vector. In an example embodiment, the target latent vector is used to trigger generation of a transformed image. In some embodiments, machine learning support component 340 of FIG. 3 invokes a transformation API (which in some embodiments is part of communication interface 325), which sends the target latent vector to image generator neural network 160 (e.g., via TCP client 355 or GRPC client 360). In some embodiments, machine learning support component 340 causes a request to be written to Redis database 345 of FIG. 3 for batching, as explained in more detail below. Once the transformed image has been generated, at block 445, the transformed image is output to a canvas on the client device. For example, machine learning support component 340 of FIG. 3 causes canvas manager 334 to update a data stream and send a representation of the transformed image (e.g., via stream component 320) to client device 110 for rendering.

In some cases, multiple transformations (edits) can be generated before the multi-step projection is complete. As such, while the multi-step projection is processing and the interim latent vector stored in non-persistent layer 490 is updated, in some cases, blocks 430-445 occur repetitively. As such, one or more transformation operations (edits) are possible on a particular image while concurrently projecting the same image into a latent space to optimize the latent vector representing the image.

Figure 5:
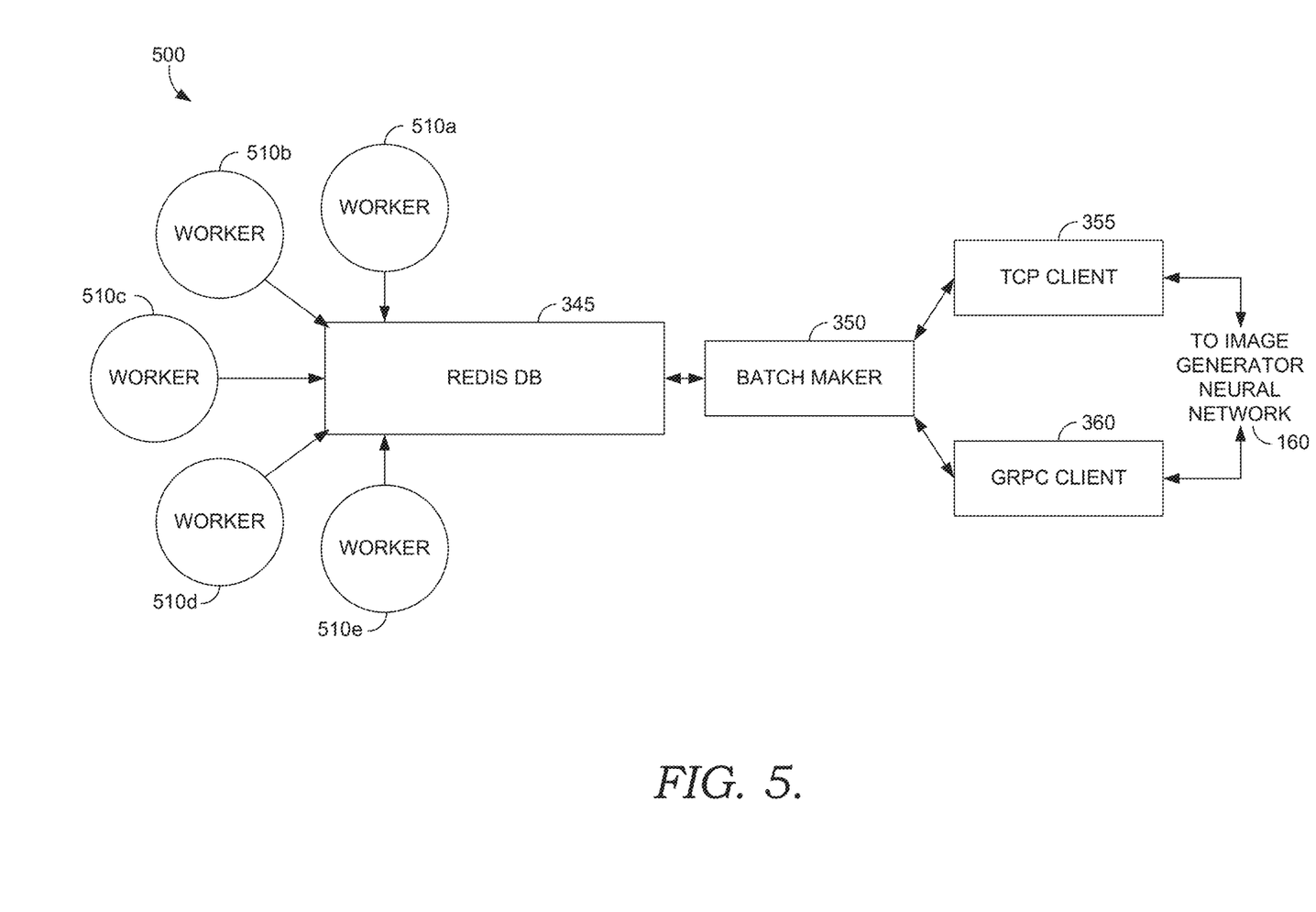
FIG. 5 is a data flow diagram illustrating an example clubbing technique, in accordance with embodiments of the present invention.

Returning now to FIG. 3 and as described above, in some embodiments, worker 310 supports multiple users. In some embodiments, worker 310 writes transformation requests (e.g., target latent vectors) from multiple users to Redis database 345 where they are aggregated, and batch maker 350 picks up and transmits a batch of transformation requests (e.g., an array of target latent vectors) to image generator neural network 160 (e.g., via TCP client 355 or GRPC client 360). FIG. 5 is a data flow diagram illustrating an example clubbing technique, in accordance with embodiments of the present invention.

FIG. 5 illustrates an example environment 500 with multiple workers 510a-e, Redis database 345, batch maker 350, TCP client 355, GRPC client 360, and image generator neural network 160. In some embodiments, workers 510a-e of FIG. 5 include worker 310 of FIG. 3, and batch maker 350, TCP client 355, GRPC client 360, and image generator neural network 160 of FIG. 5 correspond to the similarly numbed components of FIG. 3.

In this example, multiple workers 510a-e in a given container (e.g., container 308 of FIG. 3) write transformation requests (e.g., target latent vectors) from multiple users to Redis database 345 where they are aggregated. In some cases, each container is provisioned with its own database (or portion thereof), such as Redis database 345. Although FIG. 5 illustrates an example implementation using Redis database 345, any suitable database is possible within the scope of the present disclosure. In the implementation illustrated in FIG. 5, batch maker 350 includes batching logic that monitors Redis database 345 (e.g., via a Redis stream) and picks up a batch of transformation requests when the batch is full. By way of non-limiting example, batch maker 350 picks up and packages a batch of transformation requests, for example, when it determines the batch is full (e.g., a threshold number of requests such as 32 has been stored), a threshold time limit has elapsed (e.g., 100 milliseconds), or otherwise. Once a batch is picked up, batch maker 350 transmits the batch (e.g., as an array of target latent vectors) to image generator neural network 160 (e.g., via TCP client 355 or GRPC client 360). As such, image generator neural network 160 can consecutively generate transformed images, thereby minimizing (e.g., GPU) down time.

Once image generator neural network 160 generates one or more transformed images from corresponding target latent vector(s), the transformed image(s) are sent back through TCP client 355 or GRPC client 360 to batch maker 350, and batch maker 350 writes the transformed images to Redis database 345, where they are picked up by a corresponding worker 510a-e that wrote the corresponding transformation request. As such, requests from several users hosted by the same container are clubbed into one request before performing an inference on image generator neural network 160.

Figure 6:
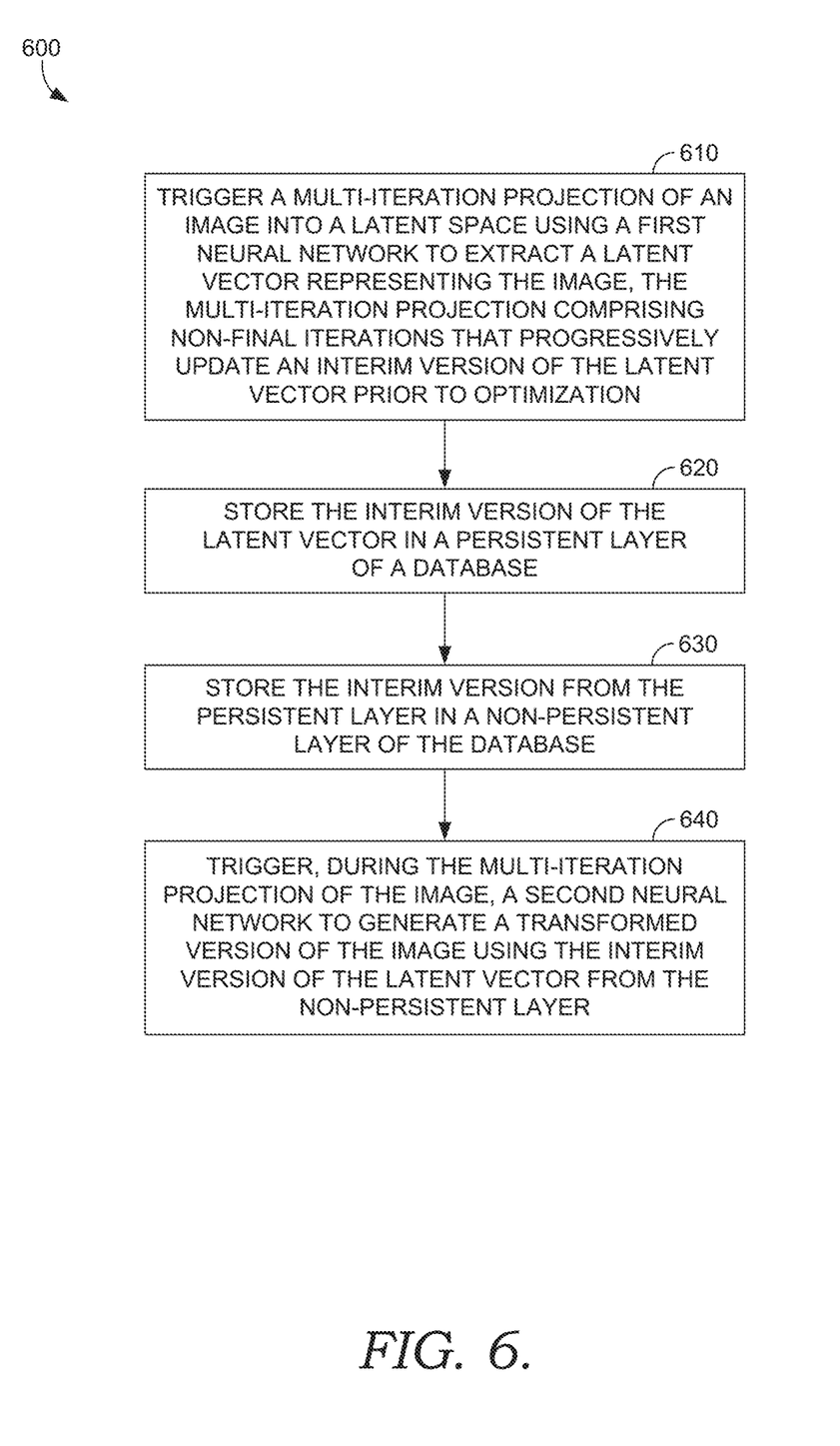
FIG. 6 is a flow diagram showing a method for generating a transformed version of an image during a multi-iteration projection of the image, in accordance with embodiments of the present invention.
Figure 7:
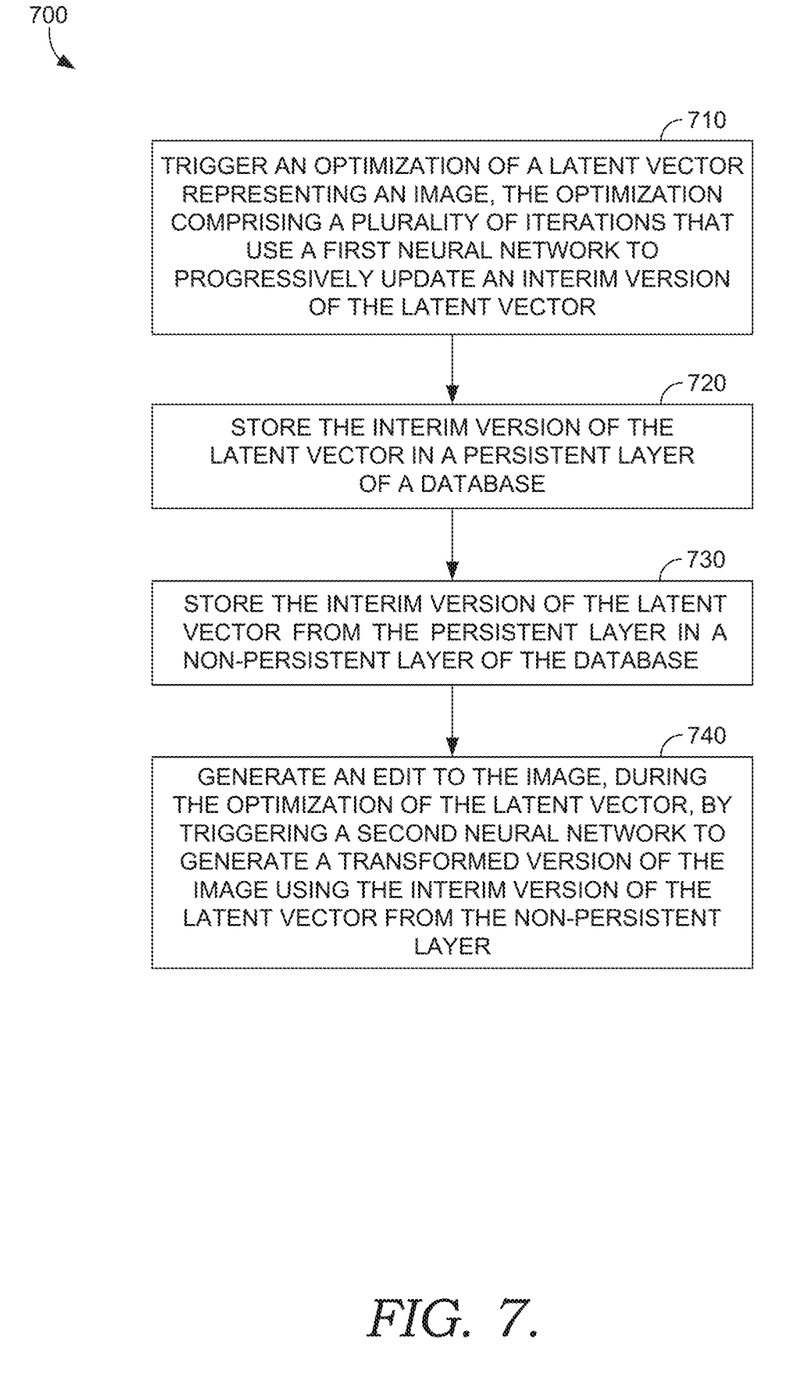
FIG. 7 is a flow diagram showing a method for generating a transformed version of an image during an optimization of a latent vector representing the image, in accordance with embodiments of the present invention.

With reference now to FIGS. 6 and 7, flow diagrams are provided illustrating methods for generating a transformed version of an image. Each block of the methods 600 and 700 and any other methods described herein comprise a computing process performed using any combination of hardware, firmware, and/or software. For instance, in some embodiments, various functions are carried out by a processor executing instructions stored in memory. In some cases, the methods are embodied as computer-usable instructions stored on computer storage media. In some implementations, the methods are provided by a standalone application, a service or hosted service (standalone or in combination with another hosted service), or a plug-in to another product, to name a few.

Turning initially to FIG. 6, FIG. 6 illustrates a method 600 for generating a transformed version of an image during a multi-iteration projection of the image, in accordance with embodiments described herein. Initially at block 610, a multi-iteration projection of an image is into a latent space is triggered. The multi-iteration projection uses a first neural network to extract a latent vector representing the image, and the multi-iteration projection comprises non-final iterations that progressively update an interim version of the latent vector prior to optimization. At block 620, the interim version of the latent vector is stored in a persistent layer of a database. At block 630, the interim version from the persistent layer is stored in a non-persistent layer of the database. At block 640, during the multi-iteration projection of the image, a second neural network is triggered to generate a transformed version of the image using the interim version of the latent vector from the non-persistent layer.

Turning now to FIG. 7, FIG. 7 illustrates a method 700 for generating a transformed version of an image during an optimization of a latent vector representing the image, in accordance with embodiments described herein. Initially at block 710, an optimization of a latent vector representing an image is triggered. The optimization comprises a plurality of iterations that use a first neural network to progressively update an interim version of the latent vector. At block 720, the interim version of the latent vector is stored in a persistent layer of a database. At block 730, the interim version of the latent vector from the persistent layer is stored in a non-persistent layer of the database. At block 740, an edit to the image is generated during the optimization of the latent vector by triggering a second neural network to generate a transformed version of the image using the interim version of the latent vector from the non-persistent layer.

Example Operating Environment

Figure 8:
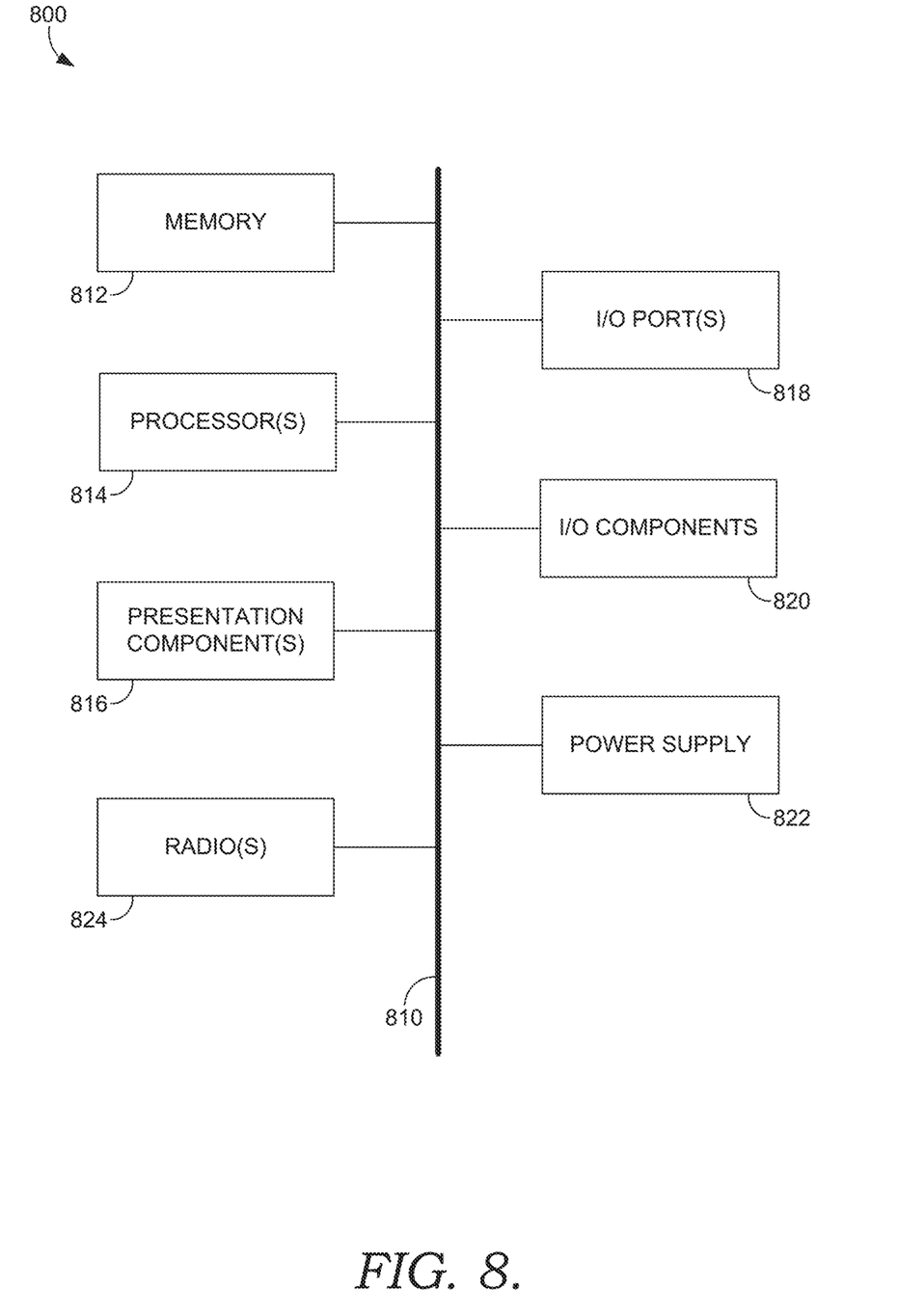
FIG. 8 is a block diagram of an example computing environment suitable for use in implementing embodiments of the present invention.

Having described an overview of embodiments of the present invention, an example operating environment in which some embodiments of the present invention are implemented is described below in order to provide a general context for various aspects of the present invention. Referring now to FIG. 8 in particular, an example operating environment for implementing embodiments of the present invention is shown and designated generally as computing device 800. Computing device 800 is but one example of a suitable computing environment and is not intended to suggest any limitation as to the scope of use or functionality of the invention. Neither should computing device 800 be interpreted as having any dependency or requirement relating to any one or combination of components illustrated.

In some embodiments, the present techniques are embodied in computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. Various embodiments are practiced in a variety of system configurations, including hand-held devices, consumer electronics, general-purpose computers, more specialty computing devices, etc. Some implementations are practiced in distributed computing environments where tasks are performed by remote-processing devices that are linked through a communications network.

With reference to the example operating environment illustrated in FIG. 8, computing device 800 includes bus 810 that directly or indirectly couples the following devices: memory 812, one or more processors 814, one or more presentation components 816, input/output (I/O) ports 818, input/output components 820, and illustrative power supply 822. Bus 810 represents what may be one or more busses (such as an address bus, data bus, or combination thereof). Although the various blocks of FIG. 8 are shown with lines for the sake of clarity, in some cases, it is not possible to delineate clear boundaries for different components. In this case, metaphorically, the lines would be grey and fuzzy. As such, the diagram of FIG. 8 and other components described herein should be understood as merely illustrative of various example implementations, such as an example computing device implementing an embodiment or a portion thereof. Distinction is not made between such categories as "workstation," "server," "laptop," "hand-held device," etc., as all are contemplated within the scope of FIG. 8 and a "computing device."

Computing device 800 typically includes a variety of computer-readable media. Computer-readable media can be any available media that can be accessed by computing device 800 and includes both volatile and nonvolatile media, and removable and non-removable media. By way of non-limiting example, in some cases, computer-readable media comprises computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 812 includes computer-storage media in the form of volatile and/or nonvolatile memory. In various embodiments, the memory is removable, non-removable, or a combination thereof. Example hardware devices include solid-state memory, hard drives, optical-disc drives, etc. Computing device 800 includes one or more processors that read data from various entities such as memory 812 or I/O components 820. Presentation component(s) 816 present data indications to a user or other device. Example presentation components include a display device, speaker, printing component, vibrating component, etc.

I/O ports 818 allow computing device 800 to be logically coupled to other devices including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs are transmitted to an appropriate network element for further processing. In some embodiments, an NUI implements any combination of speech recognition, stylus recognition, facial recognition, biometric recognition, gesture recognition both on screen and adjacent to the screen, air gestures, head and eye tracking, and/or touch recognition (as described in more detail below) associated with a display of computing device 800. In some cases, computing device 800 is equipped with depth cameras, such as stereoscopic camera systems, infrared camera systems, RGB camera systems, touchscreen technology, and combinations of these, for gesture detection and recognition. Additionally or alternatively, the computing device 800 is equipped with accelerometers or gyroscopes that enable detection of motion, and in some cases, an output of the accelerometers or gyroscopes is provided to the display of computing device 800 to render immersive augmented reality or virtual reality.

Embodiments described herein support image editing. The components described herein refer to integrated components of an image editing system. The integrated components refer to the hardware architecture and software framework that support functionality using the image editing system. The hardware architecture refers to physical components and interrelationships thereof and the software framework refers to software providing functionality that can be implemented with hardware embodied on a device.

In some embodiments, the end-to-end software-based system operates within the components of the image editing system to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. In some cases, low-level software written in machine code provides more complex functionality to higher levels of software. As used herein, computer-executable instructions includes any software, including low-level software written in machine code, higher level software such as application software and any combination thereof. In this regard, system components can manage resources and provide services for the system functionality. Any other variations and combinations thereof are contemplated with embodiments of the present invention.

Some embodiments are described with respect a neural network, a type of machine-learning model that learns to approximate unknown functions by analyzing example (e.g., training) data at different levels of abstraction. Generally, neural networks model complex non-linear relationships by generating hidden vector outputs along a sequence of inputs. In some cases, a neural network includes a model of interconnected digital neurons that communicate and learn to approximate complex functions and generate outputs based on a plurality of inputs provided to the model. In various implementations, a neural network includes any of a variety of deep learning models, including convolutional neural networks, recurrent neural networks, deep neural networks, and deep stacking networks, to name a few examples. In some embodiments, a neural network includes or otherwise makes use of one or more machine learning algorithms to learn from training data. In other words, a neural network can include an algorithm that implements deep learning techniques such as machine learning to attempt to model high-level abstractions in data. An example implementation may include a convolutional neural network including convolutional layers, pooling layers, and/or other layer types.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims:

What is claimed is:

1. One or more computer storage media storing computer-useable instructions that, when used by one or more computing devices, cause the one or more computing devices to perform operations comprising:

triggering a multi-iteration projection of an image into a latent space using a first neural network to extract a latent vector representing the image, the multi-iteration projection comprising non-final iterations that progressively update a non-optimized interim version of the latent vector prior to optimization resulting in a final optimized version of the latent vector;

storing the non-optimized interim version of the latent vector in a persistent layer of a database;

storing the non-optimized interim version from the persistent layer in a non-persistent layer of the database; and in response to a user edit via a user interface, triggering a second neural network to generate a transformed version of the image using the non-optimized interim version of the latent vector representing the image from the non-persistent layer simultaneously as the first neural network projects the image into the latent space to extract the latent vector representing the image.

2. The one or more computer storage media of claim 1, the operations further comprising periodically storing the non-optimized interim version of the latent vector in the persistent layer after every completion of a number of the non-final iterations of the multi-iteration projection.

3. The one or more computer storage media of claim 1, wherein the operations are associated with a session created for a web user on a particular worker in a multi-process container on a server, the particular worker supporting multiple instances of the operations for multiple web users.

4. The one or more computer storage media of claim 1, the operations further comprising clubbing transformation requests from multiple users hosted in a same software container prior to triggering the second neural network to generate the transformed version of the image.

5. The one or more computer storage media of claim 1, the operations further comprising clubbing transformation requests from multiple users hosted in a same software container into an array of target latent vectors, wherein triggering the second neural network comprises transmitting the array to the second neural network.

6. The one or more computer storage media of claim 1, the operations further comprising aggregating target latent vectors generated during multiple sessions running for multiple users on a common worker in a common software container.

7. The one or more computer storage media of claim 1, the operations further comprising periodically causing display of an approximation of the image corresponding to the non-optimized interim version of the latent vector, using an arithmetic sequence to increment a step size between iterations of the multi-iteration projection that trigger successive updates to the display.

8. A computerized method comprising:
triggering an optimization of a latent vector representing an image, the optimization comprising a plurality of iterations that use a first neural network to progressively update a non-optimized interim version of the latent vector;

storing the non-optimized interim version of the latent vector in a persistent layer of a database;

storing the non-optimized interim version of the latent vector from the persistent layer in a non-persistent layer of the database; and generating an edit to the image, during the optimization of the latent vector, by triggering a second neural network to generate a transformed version of the image using the non-optimized interim version of the latent vector from the non-persistent layer simultaneously as the first neural network progressively updates the non-optimized interim version of the latent vector representing the image.

9. The computerized method of claim 8, further comprising periodically storing the non-optimized interim version of the latent vector in the persistent layer after every completion of a number of iterations of the optimization.

10. The computerized method of claim 8, wherein the computerized method is associated with a session created for a web user on a particular worker in a multi-process container on a server, the particular worker supporting multiple instances of method for multiple web users.

11. The computerized method of claim 8, further comprising clubbing transformation requests from multiple users hosted in a same software container prior to triggering the second neural network to generate the transformed version of the image.

12. The computerized method of claim 8, further comprising clubbing transformation requests from multiple users hosted in a same software container into an array of target latent vectors, wherein triggering the second neural network comprises transmitting the array to the second neural network.

13. The computerized method of claim 8, further comprising aggregating target latent vectors generated during multiple sessions running for multiple users on a common worker in a common software container.

14. The computerized method of claim 8, further comprising periodically causing display of an approximation of the image corresponding to the non-optimized interim version of the latent vector, using an arithmetic sequence to increment a step size between iterations of the optimization that trigger successive updates to the display.

15. A computer system comprising:
memory comprising a persistent layer and a non-persistent layer; and
one or more hardware processors configured to cause the computer system to perform operations comprising:
triggering a projection of an image using a first neural network to progressively update a non-optimized interim version of a latent vector representing the image;

storing the non-optimized interim version of the latent vector in the persistent layer;

storing the non-optimized interim version from the persistent layer in the non-persistent layer; and in response to a user edit via a user interface, triggering, during the projection of the image, a second neural network to generate a transformed version of the image using the non-optimized interim version of the latent vector from the non-persistent layer simultaneously as the first neural network progressively updates the non-optimized interim version of the latent vector representing the image.

16. The computer system of claim 15, the operations further comprising periodically storing the non-optimized interim version of the latent vector in the persistent layer after every completion of a number of iterations of projection.

17. The computer system of claim 15, wherein the operations are associated with a session created for a web user on a particular worker in a multi-process software container executing on the one or more hardware processors, the particular worker supporting multiple instances of the operations for multiple web users.

18. The computer system of claim 15, the operations further comprising clubbing transformation requests from multiple users hosted in a same software container prior to triggering the second neural network to generate the transformed version of the image.

19. The computer system of claim 15, the operations further comprising clubbing transformation requests from multiple users hosted in a same software container into an array of target latent vectors, wherein triggering the second neural network comprises transmitting the array to the second neural network.

20. The computer system of claim 15, the operations further comprising periodically causing display of an approximation of the image corresponding to the non-optimized interim version of the latent vector, using an arithmetic sequence to increment a step size between iterations of the projection that trigger successive updates to the display.

* * * * *